United States Patent [19]

Wesner

[11] 3,917,928

[45] Nov. 4, 1975

[54] COMPARATOR FOR STEP DATA GYRO COMPASSES

[75] Inventor: Charles R. Wesner, Crozet, Va.

[73] Assignee: Sperry Rand Corporation, New York, N.Y.

[22] Filed: June 4, 1974

[21] Appl. No.: 475,470

[52] U.S. Cl............ 235/92 CA; 235/92 EV; 33/325
[51] Int. Cl.² ........................................... G06F 7/00
[58] Field of Search...... 235/92 CA, 92 EV, 105.26; 33/317 R, 321, 322, 317 D, 316, 325

[56] References Cited
UNITED STATES PATENTS

| | | | |
|---|---|---|---|
| 3,401,549 | 9/1968 | Miller | 33/321 |
| 3,403,874 | 10/1968 | Boskovich et al. | 33/321 |
| 3,746,843 | 7/1973 | Wesner | 33/325 |

Primary Examiner—Douglas W. Olms
Attorney, Agent, or Firm—Howard P. Terry; Joseph M. Roehl

[57] ABSTRACT

Apparatus for monitoring the operation of pairs of step data compasses, each being of the type which produces a number of phase-displaced pulses dependent upon the rotation of the compass. The apparatus includes circuits to form separate trains of UP or DOWN pulses in response to direction and magnitude of rotation of each compass. Each category of UP and DOWN pulses is stored in a separate pulse storage circuit and then sequentially clocked into an up-down difference counter. When the net change in the difference counter exceeds predetermined upper or lower limits, a corresponding pulse is applied to a difference accumulator. An alarm is actuated when the count stored in the difference accumulator reaches a value equal to that of an adjustable digital alarm set.

12 Claims, 4 Drawing Figures

COMPARATOR FOR STEP DATA GYRO COMPASSES

BACKGROUND OF THE INVENTION

1. Field of the Invention

The present invention relates to testing circuits and more specifically to circuits for monitoring the operation of step data compasses.

2. Description of the Prior Art

"Step data" gyrocompasses produce electrical output signals in the form of 3 phase-displaced, modulated pulse signals. As the compass heading changes, pulses are developed in each of the three phases. The number of such pulses is determined by the magnitude of the heading change.

In many compass systems, especially on larger marine vessels, two or more gyrocompasses are used at different locations aboard the vessel. By comparing the output signal of pairs of gyrocompasses, faulty operation can be readily detected. Apparatus for monitoring the operation of pairs of such gyrocompasses has been devised using mechanical assemblies of differentially connected step motors. However, such assemblies are relatively expensive, difficult to operate and maintain, and require substantial amounts of power.

SUMMARY OF THE INVENTION

According to the principles of the present invention, step data from each of the compasses to be compared is converted into a number of COUNT UP or COUNT DOWN pulses, indicative of the magnitude and direction of heading changes experienced by the compasses. Whenever the compasses diverge by a predetermined amount, an appropriate pulse is transferred to storage. If the compasses later converge, pulses are subtracted from storage. An alarm is actuated if the number of stored pulses exceeds a preset level.

DESCRIPTION OF THE PREFERRED EMBODIMENT

Figure 1:
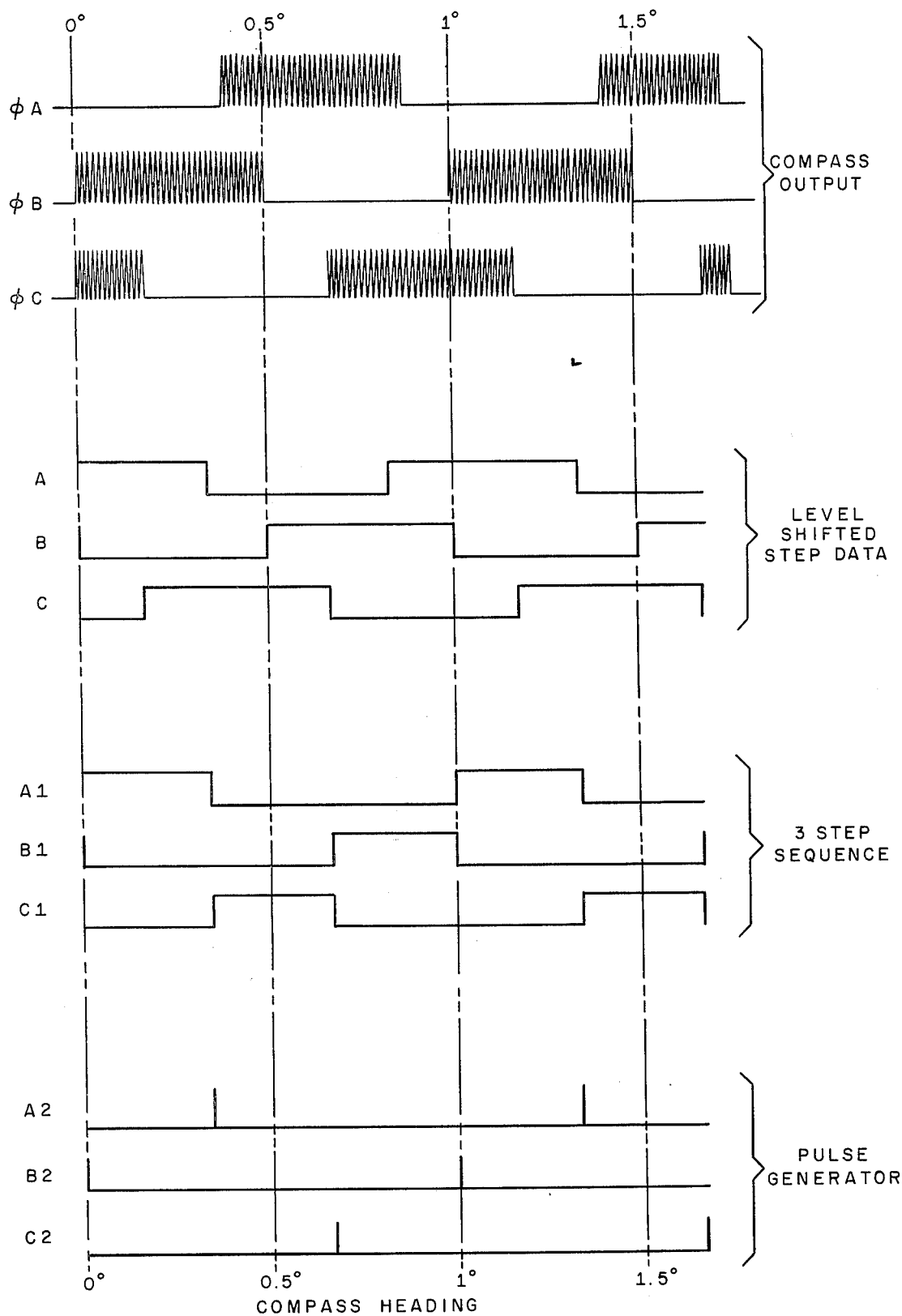
FIG. 1 is a series of graphs illustrating waveforms appearing at various points in the circuit.

The top group of pulse trains in FIG. 1 represents the signal output from a typical step data compass. Such a compass produces three phase-displaced pulse trains. Typically, the output circuit of such a compass is energized from a 60 Hz source. The alternating current signal is full wave rectified and applied to suitable utilization equipment. As the compass heading changes, a train of modulated pulses appears at each phase output terminal. The modulated pulses in the various trains are phase displaced by 120°. Normally, the compass output circuits are constructed so that a modulated pulse exists throughout a ½° variation in compass heading and the inter-pulse interval is equal to the modulated pulse width. Thus, for example, a full-wave rectified signal will appear at the output of phase B when the compass heading is between 0° and ½° whereas no output signal will appear on phase B when the compass heading is between ½° and 1°.

Since the pulse trains in the three phases are phase-displaced, the direction in which the compass heading is changing can be determined by the sequence in which the pulses appear on the various phases.

Since the modulated pulses from the various trains overlap, six combinations of high and low signals occur as the compass rotates through 1°. Thus the compass heading can be determined within 1/6°.

Figure 2A:
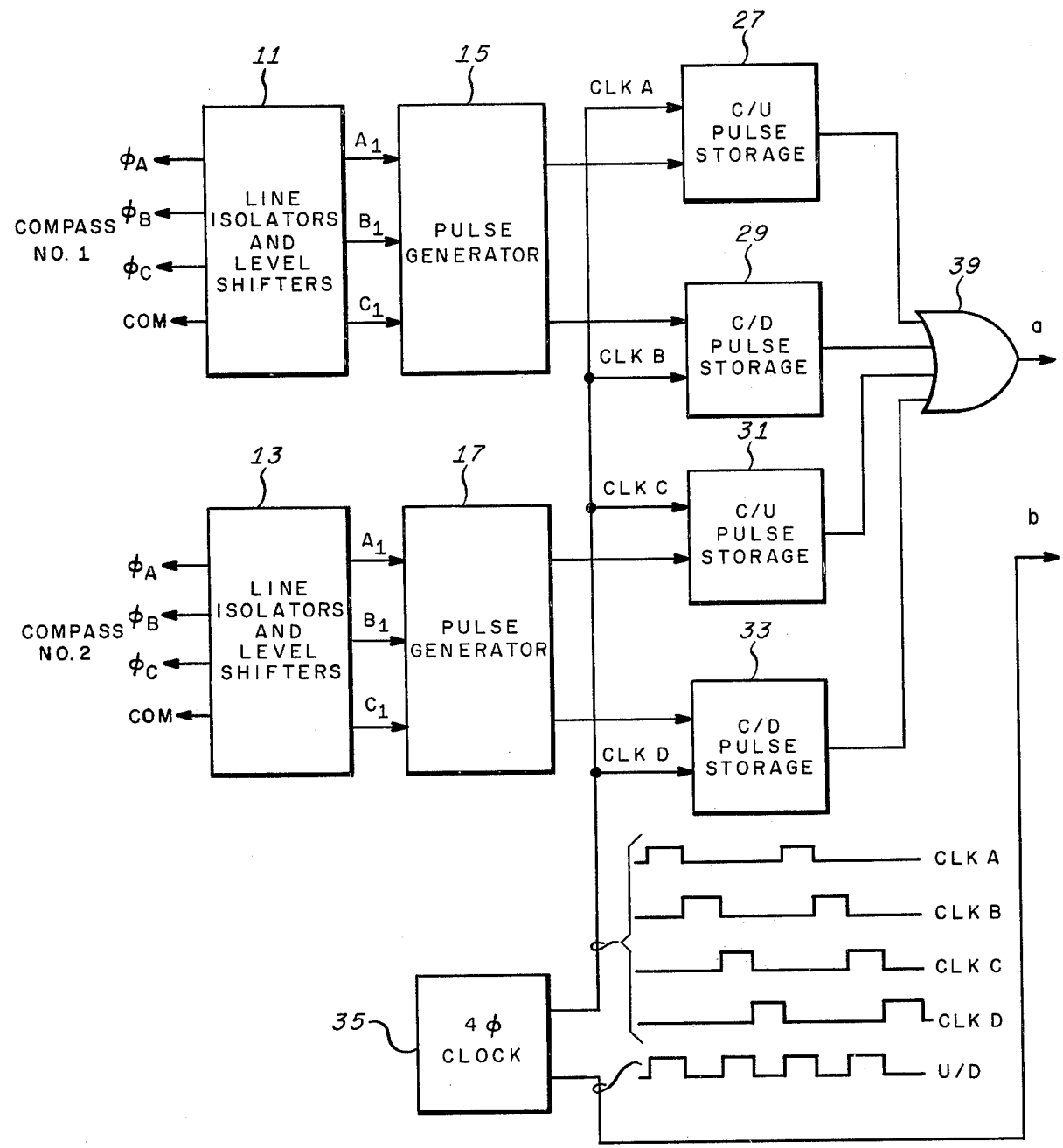
FIGS. 2a and 2b are a block diagram of a circuit employing the principles of the invention.
Figure 2B:
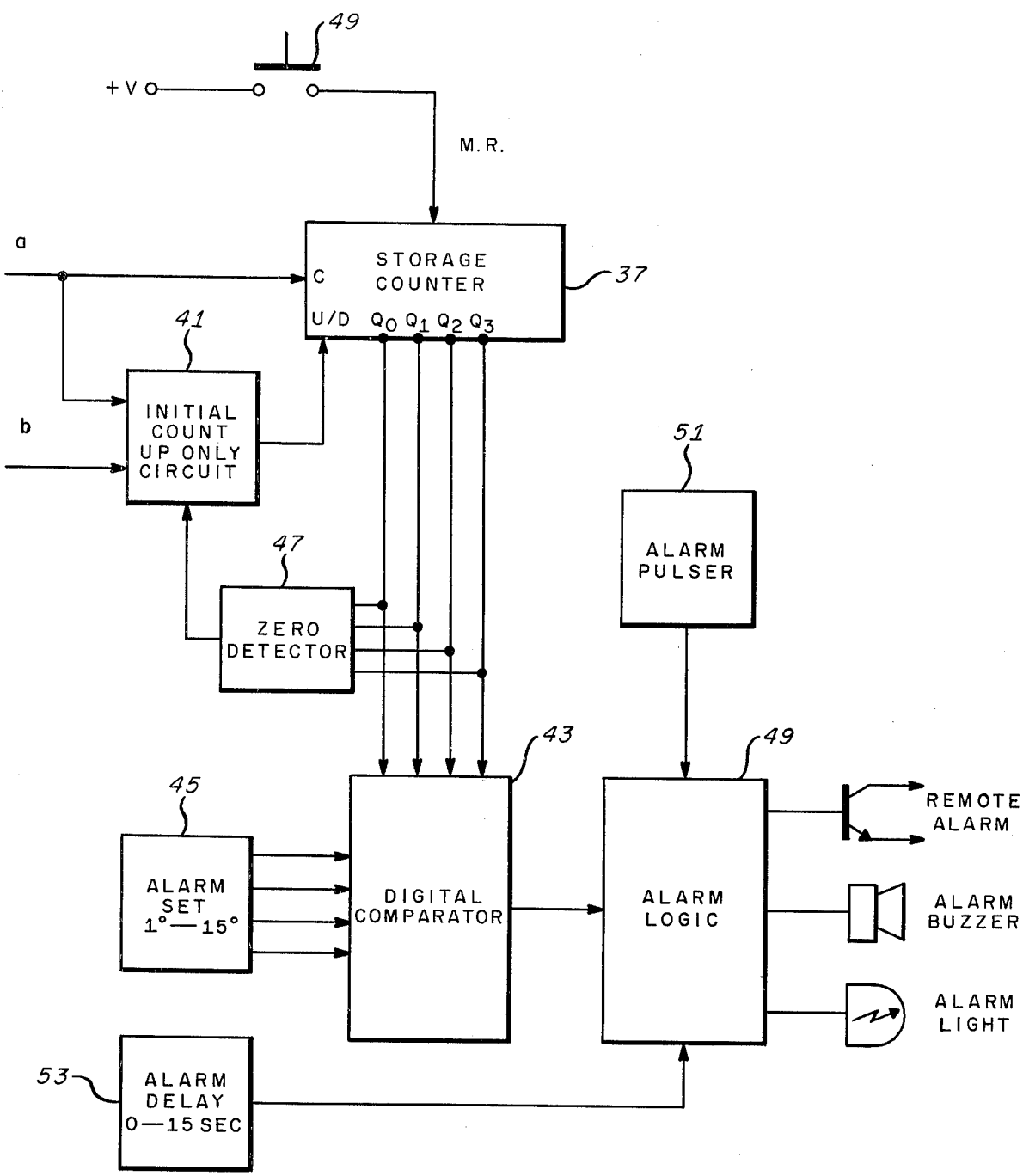

Referring now to the block diagram of FIG. 2, the output signals from the two compasses to be compared are applied to first and second line isolators and level shifters 11 and 13 respectively. Each line isolator and level shifter contains straightforward input circuits which effectively filter and invert the modulated pulses as depicted in curves A, B, and C of FIG. 1. As presently preferred, the level shifted step data pulses have a magnitude of 10 volts and are suitable for C-MOS logic levels.

The level shifted step data pulses, like the modulated step data pulses from each compass, provide six combinations of high and low signals as the compass heading changes.

Since the compass comparator of the present invention need not have a resolution of 1/6°, each line isolator and level shifter further contains straightforward logic circuits which convert the level shifted step data into a three step sequence as indicated by curves A1, B1 and C1 of FIG. 1. Thus, the logic circuits provide a high level $A_1$ voltage during the occurrence of a high level A signal and a low level B signal. The logic circuits further produce a high level $B_1$ signal in response to a high level B signal and a low level C signal and a high level $C_1$ signal during the occurrence of a high level C signal and a low level A signal.

As can be seen from FIG. 1, the three step sequence provides sequential $C_1$, $B_1$ and $A_1$ pulses as the compass heading changes in one direction and an opposite sequence of pulses as the compass heading changes in the reverse direction.

The three step sequence pulse trains from the line isolators and level shifters 11 and 13 are applied to pulse generators 15 and 17 respectively.

Each pulse generator serves as a pulse sequence detector which senses the sequence of $A_1$, $B_1$ and $C_1$ pulses applied to its input terminals and also serves to produce sharp output pulses on one or the other of its two output terminals depending upon the sequence of the $A_1$, $B_1$ and $C_1$ pulses.

Figure 3:
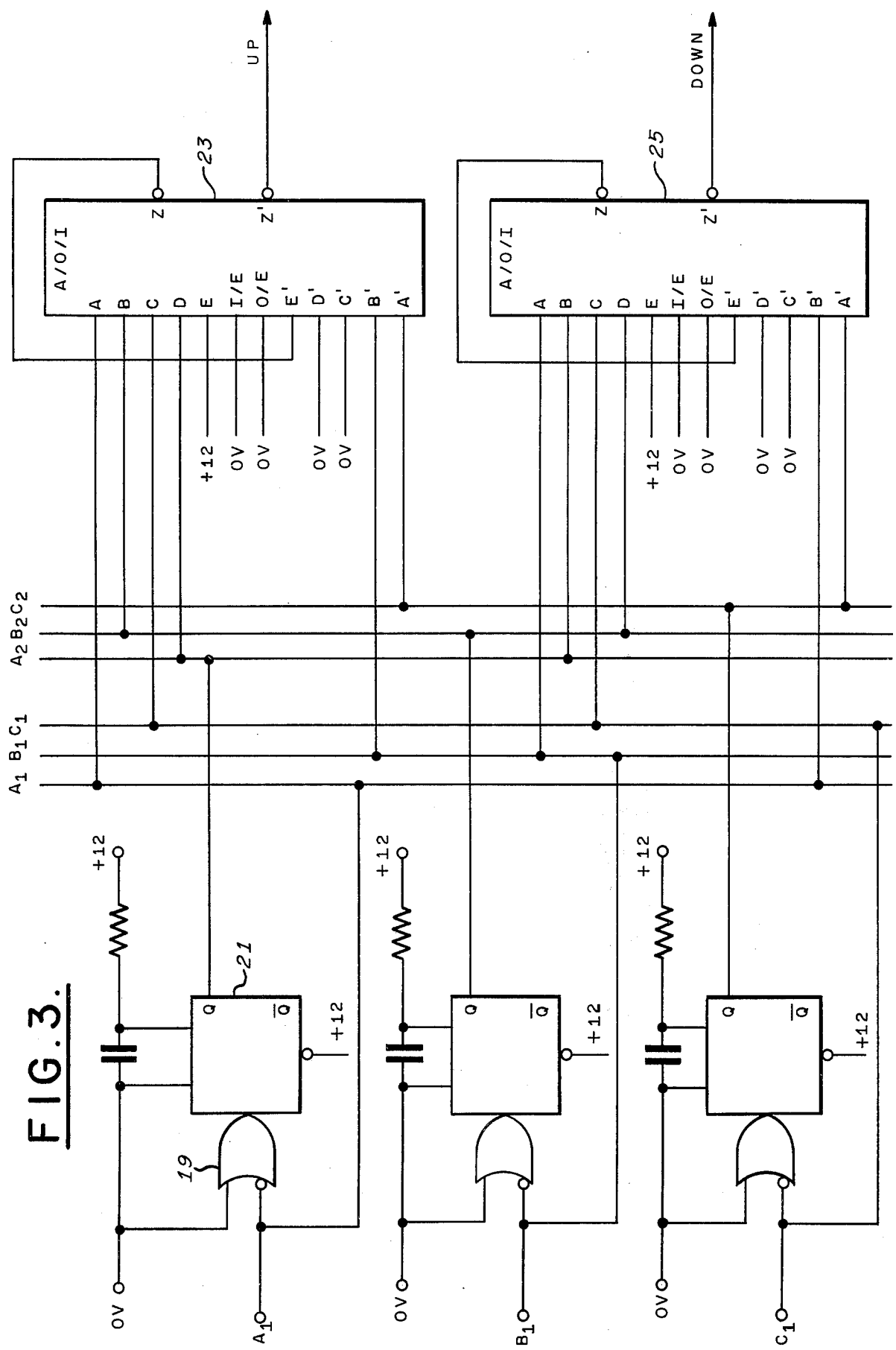
FIG. 3 is a diagram illustrating a particular pulse generator that may be used in practicing the invention.

FIG. 3 depicts a presently preferred design for a pulse generator, although it will be appreciated that variations of the circuit of FIG. 3 may be used in practicing the invention.

Each of the $A_1$, $B_1$ and $C_1$ pulse trains corresponding to the output of a given compass is applied to an individual input channel in the pulse generator.

Thus $A_1$ input signals are inverted and applied through an OR gate 19 to a one-shot multivibrator 21. The $A_1$ pulses are also applied directly to an $A_1$ bus.

During the occurrence of an $A_1$ pulse, the corresponding $A_1$ bus is at a high level. At the termination of an $A_1$ pulse, the one-shot multivibrator 21 is triggered through the inverted signal applied to the OR gate 19 and produces a sharp output pulse (typically in the order of a few microseconds duration) at its Q output terminal.

The output pulse from the one-shot multivibrator 21 is applied to a corresponding common bus $A_2$.

As can be seen from FIG. 3, busses $B_1$ and $B_2$ are energized in a similar fashion in response to a $B_1$ input signal and busses $C_1$ and $C_2$ are energized in response to a $C_1$ input signal.

The relationship of the pulses appearing on the various busses can be visualized by referring to the pulse generator and three step sequence pulse trains depicted in FIG. 1.

In the presently preferred pulse generator circuit, the sequence of pulses is detected with the aid of AND-/OR/INVERT gates 23 and 25.

As presently preferred and as indicated in FIG. 3, Motorola part number MC14506 components may be used for each of the gates 23 and 25. When these particular components are biased as indicated in FIG. 3, coincident signals applied to input terminals A and B or C and D will cause an output signal to appear at terminal Z. An input signal applied to terminal E' or coincident signals applied to terminals A' and B' will cause an output signal to appear at terminal Z'.

By connecting the gates 23 and 25 to particular combinations of busses, the gate 23 may be used to produce a train of UP pulses in response to compass heading changes in one direction and gate 25 may be used to produce DOWN pulses in response to compass heading changes in the opposite direction.

It will be seen that each pair of input terminals on the gates 23 and 25 is connected to receive a unique combination of signals from the two sets of busses. Furthermore, each pair of input terminals on the gates 23 and 25 is connected to receive one signal from the first set of busses which operates as an enabling signal and a second signal from the second set of busses which operates as a trigger signal.

As presently preferred, NAND-NOR logic is used in the comparator of the present invention. In keeping with this technique, an output signal will be produced by one of the gates 23 or 25 when a trigger pulse is applied to that gate in combination with an appropriate high level enable signal.

Thus referring to FIG. 1, which depicts conditions when the compass heading is increasing, it can be seen that A2, B2 and C2 pulses occur on high to low transitions of A1, B1 and C1 respectively. For decreasing headings, the A2, B2 and C2 pulses would be displaced ½° to the left on the diagram.

Thus it can be seen that A2 and C1 or B2 and A1 or C2 and B1 must produce count up pulses for increasing headings while A2 and B1 or B2 and C1 or C2 and A1 must produce count down pulses for decreasing headings. Pulse generator 15 performs this function for compass No. 1 and pulse generator 17 performs this function for compass No. 2.

Again referring to FIG. 2, the output pulses from the generator 15 are applied to appropriate count up and count down pulse storage circuits 27 and 29 respectively, whereas the corresponding pulses from the pulse generator 17 are applied to individual count up and count down pulse storage circuits 31 and 33 respectively.

Each of the pulse storage circuits contains a flip-flop which is set in response to a signal from the associated pulse generator and triggered by means of a clock pulse from a four-phase clock 35. The clock sequentially triggers the individual pulse storage circuit and typically produces pulses in the order of 100 microseconds duration. The clock also produces a train of square wave UP/DOWN control pulses synchronized with the clock pulses so that successive clock pulses are accompanied by alternate UP or DOWN pulses.

Since the compass heading changes will be random, output signals from the pulse generators 15 and 17 will occur at random intervals. When these pulses occur, they are temporarily stored in the appropriate storage circuit until that circuit receives a clock pulse. Thus the storage circuits act as means to convert the random step levels into a synchronous clock step level. Without such synchronization, a pulse might be received during the clocking operation and the pulse would be lost.

The circuits intercoupling the compasses and the various pulse storage means are differentially connected so that a heading change experienced by one compass will produce UP pulses whereas the identical heading change in the other compass will produce DOWN pulses.

Pulses clocked out of the various storage means are applied to a storage counter 37 through an OR gate 39. The storage counter is basically a conventional up-down counter which counts in a direction determined by the instantaneous value of an UP/DOWN control signal received from the clock 35 through an initial count up only circuit 41, which will be described.

As long as the two compasses being compared are operating normally, the storage counter experiences no net change. Assume, for instance, that both compasses are operating normally and a heading change is experienced which produces an UP pulse from the pulse generator 15. This will be stored in the storage circuit 27 and clocked into the storage counter in response to a clock A timing pulse. At the same time, the UP/DOWN control signal from the clock 35 will cause the storage counter to count up. Because of the differential connection, the same heading change experienced by the second compass will cause a DOWN pulse to appear at the output of the pulse generator 17 which will be stored in the pulse storage circuit 33. This pulse will be clocked out of the pulse storage circuit 33 in response to a clock D timing pulse. Since a clock D timing pulse is accompanied by a low-level UP/DOWN control pulse, the pulse from the storage circuit 33 will cause the counter to count down and thus cancel the pulse earlier received from the pulse storage circuit 27.

On the other hand, if the heading changes in the two compasses are not identical, the number of pulses clocked out of the storage circuits associated with the two compasses will not be equal and the storage counter will experience a net change.

In a preferred embodiment, the storage counter 37 may include conventional means for dividing the signal from the gate by three so that one count is transferred to the output terminals $Q_0 - Q_3$ in response to a net accumulation of three count up or count down pulses. With this arrangement, the output of the counter changes in 1° increments.

The binary coded output of the storage counter 37 appears at the terminals $Q_0 - Q_3$ and is applied to a digital comparator 43 wherein it is compared with the binary coded output from an adjustable alarm set 45.

Since the digital cmparator is unidirectional, whereas the storage counter must respond to pulses in both the up and down direction, the initial count up only circuit 41 and the zero detector 47 are used to modify the operation of the storage counter so that the accumulated count is always in the up direction.

The zero detector 47 is a straightforward circuit and may, for instance, consist basically of a NOR gate which will provide a high level signal to the initial count up only circuit 41 whenever the output of the storage counter becomes zero. Such a condition occurs when the start button 49 is depressed at the beginning of a measurement interval so as to provide a manual reset signal to the storage counter. The count in the storage counter may also be reduced to zero during the course of a routine comparison. For instance, the first two pulses received from the gate 39 during a comparison may be UP pulses which are then followed by a succession of two DOWN pulses. The storage counter will respond by counting up to 2 and then returning to zero.

The initial count up only circuit 41 responds to an output of the zero detector circuit so as to assure that the first pulse received after the count in the storage counter has been reduced to zero will cause the storage counter to count in the up direction. The circuit 41 is straight forward and consists essentially of an exclusive OR gate having one input terminal coupled to receive the UP/DOWN control pulses and the other input terminal coupled to receive high or low level signals from a multivibrator which is switched in accordance with the value of the UP or DOWN signal from the gate 39 in the presence of an output signal from the zero detector 47. When the count in the storage counter goes to zero, the zero detector produces an enabling signal which permits the next pulse from the gate 39 to set the multivibrator. If this pulse is an UP pulse, the multivibrator provides a low level signal to the exclusive OR gate so that the UP/DOWN pulse train passes directly to the counter 37. On the other hand, if the first pulse were a DOWN pulse, the multivibrator would produce a high level signal to the input of the exclusive OR gate so that the circuit 41 would effectively invert the UP/DOWN control pulses.

As soon as the first count is stored in the counter, the zero detector output signal will cease and the initial count up only circuit will continue to provide either direct or inverted UP/DOWN control signals until the count in the storage counter is again reduced to zero.

It will be appreciated that both UP and DOWN pulses from the gate 39 have the same amplitude, polarity and direction, but are distinguished only by their timing with relation to the UP/DOWN control pulses. Therefore, even though the storage counter has been initially set to count up, it can count in either direction in response to the value of the individual pulses after the first pulse, until the count is again reduced to zero.

The alarm set is used in conjunction with the digital comparator 43 to select a value of maximum divergence between compass readings which can be tolerated before a warning signal is applied to an alarm logic circuit 49.

The alarm set 45 typically contains a straight forward selector switch which provides a parallel binary coded output signal equivalent to values of compass divergence typically in the range of one degree to 15 degrees.

The digital comparator 43 is a conventional circuit connected so that if the count in the storage counter 37 reaches the binary value selected for the alarm set, a warning signal will be applied to the alarm logic 49.

The alarm logic is intermittently enabled through an alarm pulser 51 after a predetermined delay established by means of an adjustable alarm delay 53. The alarm pulser is a conventional pulse generator and the alarm delay may be any suitable time delay network such as an R-C network.

The alarm delay is included in the circuit so that spurious transients will not actuate the alarm devices, whereas the alarm pulser is included in the circuit to provide intermittent audible or flashing visible signals.

Provisions for a remote alarm may also be included in the circuit if desired.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus for comparing the output signals from pairs of step data compasses, each of said compasses being of the type that produces output signals consisting of phase-displaced trains of N modulated pulses per degree of compass rotation, pulse conversion means for converting the output signals of each of the compasses into separate UP or DOWN pulse trains as the associated compass rotates in first or second directions respectively, said pulse conversion means being differentially connected so that rotation of both compasses in the same direction produces UP pulses from one compass and DOWN pulses from the other compass, storage means for separately storing the UP and DOWN pulses of each compass, clock means for sequentially interrogating the individual storage means, means in said clock means for producing UP and DOWN control signals during the interrogation of UP and DOWN storage means, respectively, storage counter means coupled to receive signals read out of each of said storage means in response to interrogating signals from said clock means, means responsive to control signals from the clock means to cause said counter to count in opposite directions in response to pulses read out of UP and DOWN storage means respectively, means to actuate an alarm after the count in said storage counter reaches a specified value.

2. The apparatus of claim 1 wherein the control signal responsive means includes an initial count up only circuit and means to detect a zero count in said counter, said initial count up only circuit being responsive to said zero count detection means to set the counter to count up in response to the next signal read out of the pulse storage means, said initial count up only circuit further being constructed to count up in response to succeeding signals from said storge means having the same value as said next signal and to count down in response to succeeding signals having a value opposite to that of said next signal.

3. The apparatus of claim 1 wherein the means for actuating an alarm includes an adjustable alarm setting means for permitting the alarm to be actuated only after the storage counter has accumulated a selected count.

4. The apparatus of claim 3 wherein said adjustable alarm setting means includes selection means for producing a binary coded output indicative of a maximum compass divergence to be tolerated and digital comparator means for comparing the output of said selection means with the output of said storage counter.

5. The apparatus of claim 4 wherein the means for actuating an alarm further includes delay means for actuating the alarm only after an alarm condition has existed for a predetermined period of time.

6. The apparatus of claim 1 wherein the pulse conversion means includes means to convert the step data from each compass into three trains of d.c. pulses in a three-step sequence, and pulse sequence detecting means for producing UP pulses when the pulses in said three-step sequence occur in a first order and DOWN pulses when the pulses in the three-step sequence occur in the opposite order.

7. The apparatus of claim 6 wherein the pulse sequence detecting means includes individual one-shot multivibrators corresponding to each train of d.c. pulses, said multivibrators being arranged to produce a sharp trigger pulse at the termination of each corresponding pulse in said three-step sequence, and a plurality of AND gates, each of said AND gates being connected to receive a unique combination of the pulses in one of said trains in the three-step sequence and the trigger pulses derived from another of the trains in said three-step sequence, said AND gates being arranged in a first group corresponding to combinations that occur when the three step sequence is in a first order and in a second group corresponding to combinations that occur when the three step sequence is in the opposite order, said pulse sequence detecting means including a first OR gate to produce an UP pulse in response to a signal from one of the AND gates in said first group and a second OR gate to produce a DOWN pulse in response to a signal from one of the AND gates in said second group.

8. The apparatus of claim 1 wherein the thresholding means is adjusted to provide a single COUNT UP or COUNT DOWN pulse for each degree of divergence in the headings of the two compasses being compared.

9. The apparatus of claim 8 further characterized in that said difference accumulator includes an UP/DOWN counter and logic means for assuring that the first pulse received from said thresholding means during a given comparison interval sets the counter to read in the UP direction regardless of whether said first pulse is a COUNT UP or a COUNT DOWN pulse.

10. The apparatus of claim 9 wherein said logic means in the difference accumulator further includes means to re-establish the counting direction whenever the count in said counter reaches zero.

11. The apparatus of claim 1 wherein said difference accumulator provides a parallel binary coded output and said alarm actuating means includes an adjustable alarm set means for providing a parallel binary coded reference signal, said alarm actuating means further including a digital comparator for producing a warning signal when the output of said difference accumulator exceeds the value of the output of said adjustable alarm set.

12. The apparatus of claim 11 wherein said alarm actuating means further includes delay means for actuating an alarm device only after a warning signal from said digital comparator has existed for a pre-selected length of time.

* * * * *